July 5, 1960
D. KERR
2,944,254
METHOD AND APPARATUS FOR MEASURING
DISTANCE IN RADIO HOMING SYSTEMS
Filed Oct. 12, 1953
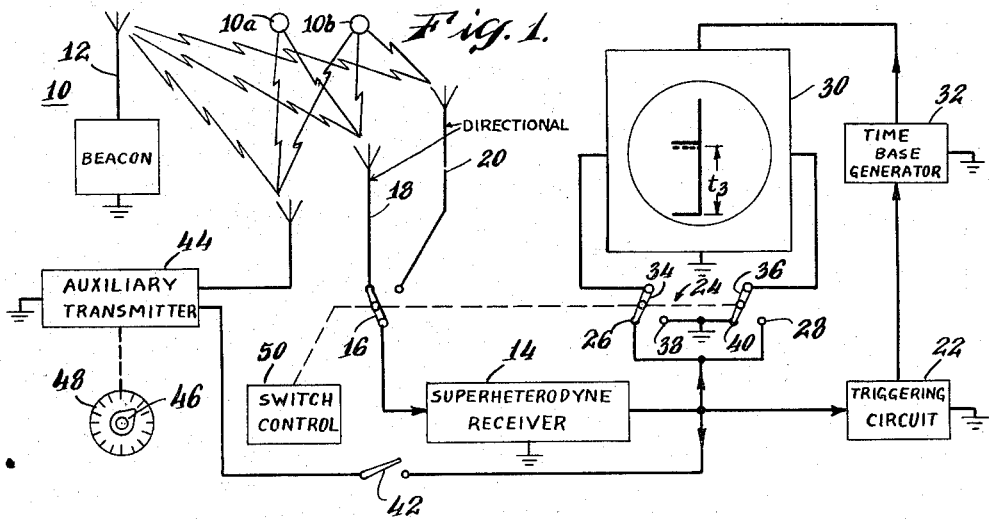
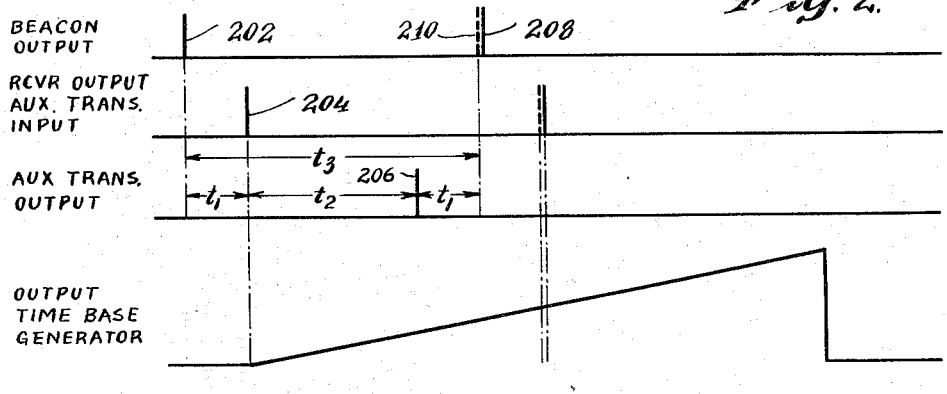
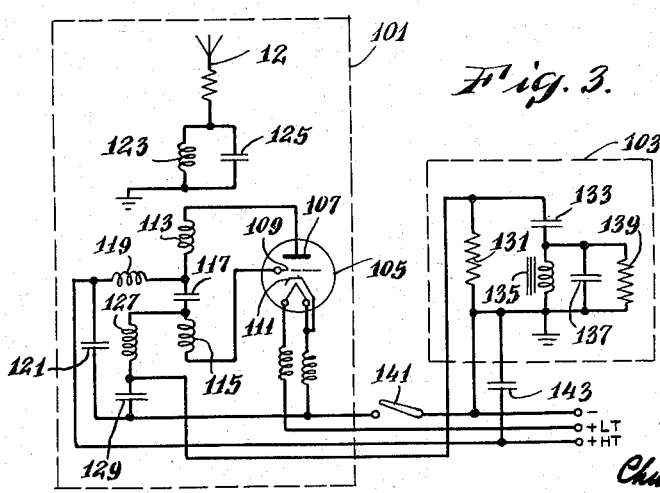
INVENTOR.
David Kerr
BY
Churchill, Rich, Weymouth Pingel
ATTORNEYS.

United States Patent Office 2,944,254
Patented July 5, 1960

2,944,254

METHOD AND APPARATUS FOR MEASURING DISTANCE IN RADIO HOMING SYSTEMS

David Kerr, Ealing, London, England, assignor to Ultra Electric, Inc., Wilmington, Del., a corporation of Delaware Filed Oct. 12, 1953, Ser. No. 385,625

Claims priority, application Great Britain Nov. 14, 1952

14 Claims. (Cl. 343—11)

This invention relates to the art of radio location or homing. More specifically the invention is related to that form of radio location wherein one or more transmitters or beacons are provided to define a given point or geographical position which it is desired to locate and complementary receiving apparatus is provided which may be carried by a searching party or the like.

Radio locating apparatus of the above type can be particularly useful in locating persons lost at sea when the person is provided with the beacon, for example, as part of his life saving equipment. In such situations a search craft provided with the proper receiving equipment can intercept the transmitted signals and utilize them for the purpose of homing on the victim.

A system employing apparatus of the above type has been described in my copending application Serial No. 385,623, filed concurrently herewith, now U.S. Patent No. 2,841,788, issued July 1, 1958. As described in said copending application there are provided a plurality of beacons or transmitters each of which is capable of emitting a radio frequency signal which is pulse modulated. The modulation consists of spaced groups of pulses wherein the interval between successive groups from a given beacon is long relative to the duration of a single group and wherein the spacing between the pulses of a given group differs from beacon to beacon. The receiving apparatus provided for operation in conjunction with said beacons comprises a display device and means for operating said display device sequentially in synchronism with each one of the beacons within radio range whereby the operator may simultaneously observe indications corresponding to each of the beacons and may individually identify the same.

Although the apparatus disclosed in my copending application provides information as to direction and identity it does not provide range information.

It is therefore an object of the present invention to provide a method and means whereby the range of any one of the beacons within "sight" of the receiver may be selectively ascertained.

In accomplishing the stated object, the present invention contemplates the provision of an auxiliary transmitter at the receiver which transmitter is arranged to emit an interrogating or ranging signal synchronized with, but a selected time interval after, receipt of a signal from a given beacon in such manner as to provide range information. A feature of the present invention is the provision in the beacon of an oscillator which is susceptible, for a short time before normal operation, of premature operation in response to a triggering signal.

A better understanding of the invention as well as of the numerous advantages thereof will be had from a reading of the following detailed description when taken in connection with the accompanying drawings in which:

Figure 1 illustrates in block diagram form the basic components of the beacon and receiver as well as the various interconnections;

Fig. 2 comprises a series of curves helpful in explaining the operation of Fig. 1; and Fig. 3 is a schematic diagram representing the circuit of a typical beacon.

Referring now to Fig. 1, there is indicated generally by the reference character 10 a transmitting device or beacon for transmitting a radio pulse signal. It will be assumed that an individual has been "lost" at sea and that he is carrying or wearing the beacon. Because the system to be described is intended to operate with one or more beacons as described in my above-mentioned copending application, additional beacons are shown schematically at 10a and 10b.

Each beacon comprises a small transmitter which is battery operated and designed, when energized, to be free-running and to send out spaced groups of short pulses of radio frequency energy. The pulse envelope is shown in the first line of Fig. 2. This line shows two pulses (solid lines) which combine to constitute a single pulse group emitted by the beacon. Further groups of two pulses each are radiated at spaced intervals. Due to space limitations, only one group has been illustrated. In addition to the required wave train the transmitter need only employ a radio frequency carrier whose frequency is sufficiently high to provide line of sight transmission. As shown for beacon 10, each beacon includes an antenna 12 which may take the form of a vertical rod or the like.

Reference should now be had to Fig. 3 wherein the circuit of a typical beacon is shown in schematic form. Basically the circuit may be divided into two component parts: (1) the R.F. unit within the dotted rectangle 101, and (2) the modulating or coding unit within the dotted rectangle 103.

The R.F. unit includes an oscillator, an antenna coupling arrangement, and an antenna. The oscillator is of the Colpitts type and comprises the vacuum tube 105 having at least an anode 107, a control grid or element 109 and a cathode 111. A feedback transformer has its primary winding 113 connected in series with the anode 107, and its secondary winding 115 connected in series with the control grid 109. The free ends of the transformer windings are connected through a direct current blocking capacitor 117. Operating voltage for the anode 107 is obtained from a terminal marked +HT which is connected to the junction of 113 and 117 through a radio frequency choke 119. Capacitor 121 is a radio frequency by-pass to ground. Coupled to the feedback transformer is a tertiary winding 123 which is connected between an antenna 12 and ground. As shown, a trimmer capacitor 125 may be provided for tuning the antenna circuit.

The modulating unit 103 completes the grid-cathode circuit of the oscillator being connected through the radio frequency choke 127 to the junction between winding 115 and capacitor 117. Capacitor 129 is another radio frequency by-pass to ground. Unit 103 comprises a grid leak resistance 131 which is effectively connected between the control grid 109 and the cathode 111. Shunting resistor 131 is a timing capacitor 133 in series with a ringing circuit comprising choke 135, capacitor 137, and damping resistor 139.

The beacon circuit is completed by the provision of a power switch 141 and an anode voltage storage capacitor 143.

When the switch 141 is closed the filament of tube 105 is energized from the low voltage supply marked +LT and voltage is applied between the anode and cathode. The circuit will commence to oscillate at a radio frequency determined by the circuit constants. By suitable adjustment the tube is arranged to draw grid current while oscillating, thereby building up a charge across capacitors 133 and 137 in series. The charge quickly blocks the tube causing an interruption of the oscillations. Operating thusly, the oscillator may be referred to as a squegging oscillator. However, as a result of the rapid charging of capacitor 137, the ringing circuit commences to produce a damped sinusoidal wave. The value of resistor 139 determines the degree of damping in known manner. When the junction between capacitors 133 and 137 swings in the positive direction with respect to the other terminal of capacitor 137 it will briefly overcome the bias due to the charge on capacitor 133 and the tube 105 will begin again to oscillate. Thus, the squegging action of the oscillator is further modulated. During this second period of oscillation the capacitor 133 will receive an additional charge which in conjunction with the damping effect of resistor 139 will cause the tube 105 to stop oscillating and to remain dormant for an extended period. This period will be determined by the time it takes the charge on capacitor 133 to leak off through resistor 131. In the meantime the charge on capacitor 137 will have been dissipated across choke 135 and resistor 139.

There is thus provided a circuit which transmits spaced groups of two pulses each. The spacing between the two pulses of a group is determined by proper selection of 135, 137 and 139. The intergroup spacing is determined by suitable choice of 131 and 133.

The apparatus described above with reference to Fig. 3 is described and claimed in copending application, Serial No. 357,698, filed May 27, 1953, by myself jointly with Leonard George Walter Knott, and assigned to the same assignee as the present application.

Returning now to Fig. 1, the receiving means comprises a conventional superheterodyne type of receiver 14 arranged to have its input connected alternately by means of switch 16 to one or the other of antennas 18 and 20. The output of the receiver 14 is coupled over a first path to a time base synchronizing circuit or triggering circuit 22, over a second path to terminals 26 and 28 of a switching device 24, and over a third path through a switch 42 to an auxiliary transmitter 44.

A display device is provided in the form of a cathode ray oscilloscope 30. As illustrated, the oscilloscope 30 is provided with means for deflecting its beam along both the X-axis and the Y-axis. Deflection along the Y-axis is controlled by the output from a triggered time base generator 32, which, in turn, is controlled by the output from the synchronizing circuit 22.

The generator 32 in cooperation with the triggering circuit 22 should be of the type which responds to an input triggering pulse to produce a single cycle of a deflection voltage wave and then remains dormant until the next triggering pulse is received. These circuits are well known and therefore are not described in detail. Such circuits also have the quality of remaining insensitive to further triggering pulses received during a wave producing cycle. For the present example it will be assumed that the output of the generator 32 is sawtooth in nature.

Deflection along the X-axis is controlled by the output from receiver 14 applied to the oscilloscope display device 30 through switching device 24. As shown, one terminal of the X-axis deflection means is connected to switch element 34 while the other terminal of the deflection means is connected to switch element 36. Switch element 34 is arranged to selectively engage terminal 26 or a second terminal 38. Similarly switch element 36 selectively engages terminal 28 or another terminal 40. Terminals 38 and 40 are connected together and to ground or any other point of reference potential.

The switch elements 34 and 36 are ganged together as well as being ganged with switch 16. With the switches in the position illustrated, antenna 18 is connected to the receiver 14 while the output of the receiver is connected to the left side of the oscilloscope, the right side being grounded. It should be understood that reference to the right and left side of the oscilloscope is purely for the purpose of simplifying the description and is intended to refer to the direction in which the beam is deflected along the X-axis. Therefore, when a pulse is received by antenna 18 it will show up on the screen of the oscilloscope as a trace or line originating at the Y-axis and extending toward the left parallel to the X-axis.

When the switches are operated to their alternative position, antenna 20 will be connected to the receiver and any signal it picks up will cause a deflection of the beam towards the right of the Y-axis. Thus, it can be seen that means are provided for visually comparing the strength of the signals intercepted by the respective antennas.

Refer now to switch control means 50 for operating the switches 16 and 24. The means 50 could take the form of a motor, assuming that the switches, illustrated diagrammatically, are of the mechanical type. However, the switching may obviously be performed electronically wherein means 50 might take the form of an oscillator, for example. In any case, it should be understood that the switches are only diagrammatically illustrated.

The method employed for providing homing information will now be described briefly. The two antennas 18 and 20 are so constructed, employing well known techniques, that they are highly directive, having an axis of maximum sensitivity. The axis of maximum sensitivity of each, however, is inclined in the horizontal plane with respect to the axis of the other. Therefore if the remote beacon is on a line bisecting the angle formed by the axes of greatest sensitivity, then the strength of the signals provided by each antenna will be equal. If, however, the remote beacon is off to one side, the signal provided by one antenna will be much stronger than that provided by the other antenna. Knowledge of which antenna is providing the stronger signal will provide the relative direction of the beacon. As stated above, the relative lengths of the respective traces on the oscilloscope screen will provide such information.

The auxiliary transmitter 44 is provided for the purpose of ascertaining the range of any of the beacons "observed" by the receiver. When it is desired to determine the distance from the receiver to a remote beacon, the operator closes switch 42. This connects the output of the superheterodyne receiver 14 to the input of the auxiliary transmitter 44. As stated above, the signals transmitted by the beacons comprise spaced groups of pulses. The auxiliary transmitter comprises an adjustable pulse delay device such as a tapped delay line or a mono-stable trigger circuit, or other known delay apparatus. The reception of the first pulse of any group causes the auxiliary transmitter to operate after a predetermined delay to transmit a pulse of radio frequency energy. The frequency employed is the same radio frequency to which the beacons are tuned. A control knob 46 permits the operator to vary the delay time while he observes the oscilloscope screen. The display of a single beacon is represented in Fig. 1 by the solid line traces. However, when the time delay is properly adjusted, the upper trace will be displaced to the dotted position, for example. Reading the dial 48 associated with knob 46 will furnish the range.

The operation of the range feature will be better understood by referring to Fig. 2. As stated before, line 1 represents the beacon output. The solid lines represent the two pulses of a group during normal operation. Considering the first pulse 202, it experiences the usual delay in transmission between the beacon and the receiver. As is well known, the delay is directly proportional to the distance of travel and readily computable from a knowledge of the velocity of radio waves. The solid line 204 in line 2 therefore represents the delayed receipt of this pulse at the receiving apparatus. Ignoring any delay through the receiver 14, this line also represents the input to the auxiliary transmitter 44. Assume that the transmission time between beacon and receiver is equal to time $t_1$. Now assume, as shown in line 3, that the transmitter 44 sends out the pulse 206 a selected interval or time $t_2$ after receipt of pulse 204. This pulse 206 will again take time $t_1$ to reach the beacon. If the sum of times $t_1$ plus $t_2$ plus $t_1$ is just slightly less than the normal interval or time $t_3$ between the two pulses 202 and 208, then pulse 208 will be emitted prematurely. That is, the beacon will emit the second pulse upon receipt of the signal from the auxiliary transmitter as shown by the dotted pulse 210.

It should be understood that the squegging oscillator circuit described with reference to Fig. 3 acts as a sensitive receiver for a very short interval prior to breaking into oscillation. It is only during this short interval that it can be triggered by the signal from the auxiliary transmitter. For this reason it should be obvious that when the operator observes the shift in position of the second pulse, the sum of times $t_1$ plus $t_2$ plus $t_1$ is substantially equal to $t_3$. Since $t_3$ is ascertainable from the screen of the oscilloscope as shown in Fig. 1 and $t_2$ is known for a given setting of knob 46, the value of $t_1$ is readily computable. In fact, the provision of a suitable dial 48 can provide a direct reading of $t_1$ in terms of miles or other desired unit of measure.

Line 4 of Fig. 2 represents the output of the time base generator 32. It commences with the receipt of pulse 204 and terminates a fixed time thereafter. This is described in further detail in my aforementioned application Serial No. 385,623.

There has thus been described a novel method and arrangement for operation with a radio beacon homing system whereby the distance between any observed beacon and the searching receiver may be readily ascertained.

What I claim is:

1. In a radio locating system of the homing type employing means for radiating pulses of radio frequency energy from the point to be located and means for detecting said radiated energy to furnish directional information, detecting means comprising apparatus including a cathode ray tube indicating device upon which said pulses are displayed for determining the time interval therebetween, transmitting means associated with said apparatus and arranged to emit a signal in response to receipt of a first pulse from said radiating means, said emitted signal being arranged when timed to reach said radiating means in substantial coincidence with the imminent radiation of a subsequent pulse to modify said subsequent pulse output in a manner such that the display of said subsequent pulse on said indicating device is identifiable as such, and means for adjustably delaying the emission of said signal a predeterminable interval after receipt of said first pulse, said last-mentioned means being adjustable until said modified pulse output is identified, whereby the distance between said point and said detecting means may be determined even though the means for radiating pulses from the point is free running.

2. A radio locating system of the homing type comprising a free-running beacon transmitting means for operation at a position to be located, said transmitting means comprising means for producing spaced groups of pulses of radio frequency energy, said pulses being produced at given moments, said last-mentioned means being arranged to produce prematurely a pulse in the presence of a triggering signal occurring within a given short time interval before the given moment for producing said pulse, detecting means operable at a search position for determining the time interval between pulses of a group, said detecting means including means for indicating the receipt of a premature pulse, auxiliary transmitting means associated with said detecting means for emitting said triggering signal in response to receipt of an activating pulse from said beacon transmitting means, and means for adjustably delaying the emission of said signal by said auxiliary transmitting means for a predeterminable period after receipt of said activating pulse, said delaying means being adjustable until receipt of a premature pulse is indicated, whereby the distance between said beacon transmitting means and said detecting means may be determined.

3. A radio locating system of the homing type according to claim 2, wherein said means for producing spaced groups of pulses comprises a squegging oscillator.

4. A radio locating system according to claim 3, wherein said means for producing spaced groups of pulses further comprises a ringing circuit connected with said squegging oscillator for normally timing the interval between pulses of a group to produce said pulses at said given moments.

5. A radio locating system according to claim 2, wherein said means for producing spaced groups of pulses is constructed to produce groups each of two pulses having a given inter-pulse interval, and said auxiliary transmitting means is constructed to respond to the first one of said two pulses for causing said delayed emission, the delay being adjustable so as to cause premature production of the second one of said two pulses whereby said inter-pulse interval is decreased.

6. A radio locating system according to claim 2, wherein the means for adjustably delaying the emission by the auxiliary transmitting means comprises a manually operated control associated with a calibrated dial for providing directly the range of said beacon transmitting means from said detecting means.

7. In a radio locating system of the homing type a beacon transmitter comprising an oscillatory circuit for causing emission of spaced groups of equally spaced pulses of radio frequency energy, each group comprising two pulses normally occurring a given interval apart, the spacing between successive groups being long relative to the duration of a single group, said oscillatory circuit comprising means for increasing its propensity to oscillate for a given period immediately prior to the normal occurrence of a pulse, and means coupled with said oscillatory circuit for applying thereto a triggering signal during said given period whereby said given interval between pulses is altered.

8. In a radio locating system of the homing type a beacon transmitter according to claim 7 for operation at a position to be located, and auxiliary transmitting means operable at a search position responsive to the first pulse of each group for providing said triggering signal a determinable time after receipt of said first pulse.

9. In a radio locating system of the homing type receiving apparatus for observing simultaneously a plurality of free-running beacon devices, said receiving apparatus comprising means for receiving radio frequency energy emanating from said beacon devices, display means coupled to said receiving means for simultaneously displaying both directional and identifying information corresponding to one or more beacon devices, and range determining means in the form of a transmitter with adjustable delay means associated with said display means and coupled to said receiving means for transmitting a range determining signal only in response to receipt of a signal originating with one of said beacon devices, the transmission of said range determining signal occurring a predeterminable interval as determined by said delay means after the receipt of said beacon signal, said delay means being adjustable until the character of the energy emanating from one of said beacon devices is altered with proper adjustment of said transmitter being indicated by said display means.

10. In a radio locating system of the homing type receiving apparatus according to claim 9, wherein said display means is constructed to provide a visual display comprising a straight-line time base trace and lateral pulse indications, the normal positioning of said pulse indications relative to said time base trace providing said directional and identifying information, and said proper adjustment of said transmitter is indicated by displacement of at least one of said pulse indications from said normal positioning.

11. A radio locating system of the homing type comprising a plurality of transmitting means for operation at different locations, said transmitting means each being constructed to radiate spaced groups of pulses of radio frequency energy, the duration of a group being short relative to the time interval between successive groups from a given transmitting means, the spacing between successive pulses of a group being different for each of said transmitting means and alterable upon receipt of an external triggering pulse within a short interval before the moment for normally radiating a pulse; and receiving apparatus comprising a cathode ray tube device, a triggered time base generating circuit coupled to said tube, receiving means coupled to said tube and to said generating circuit for supplying received pulses thereto, said generating circuit being constructed and arranged to initiate a time base cycle of fixed duration upon receipt of the first pulse of any group, said fixed duration being only slightly longer than the maximum duration of a pulse group from any transmitting means, and auxiliary transmitting means coupled to said receiving means, said auxiliary transmitting means comprising means for transmitting a triggering pulse of radio frequency energy a controllable time after receipt of the first pulse of a group from a selected transmitting means, the time of transmission of said triggering pulse being chosen such that it arrives at said selected transmitting means within said short interval prior to the moment for normal radiation of the second pulse of said group, whereby pulses from more than one transmitting means may be simultaneously displayed by the tube device, the normal position of a pulse indication along the time base being indicative of the identity of the transmitting means, and whereby the pulse indication corresponding to the second pulse of said group may be displaced from its normal position to indicate the arrival of a triggering pulse at the corresponding transmitting means.

12. A radio locating system according to claim 11, wherein switch means are provided intermediate said auxiliary transmitting means and said receiving means whereby operation of said auxiliary transmitter may be interrupted.

13. A radio locating system according to claim 11, wherein said auxiliary transmitting means is provided with a control element for selectably choosing said time of transmission, and a dial associated with said control element, said dial being calibrated to convert the transit time ($t_1$) between transmitting means and receiving means into units of distance, the transit time being determined by one-half the algebraic difference between the time interval between said first and second pulses ($t_3$) and said controllable time ($t_2$).

14. The method of determining the distance from a radio homing receiver to a radio beacon capable of emitting spaced pairs of pulses of radio frequency energy comprising the steps of measuring the time interval between successive pulses of a pair, selecting a first time interval less than the interval between said successive pulses and transmitting a ranging pulse said selected interval after receipt of the first pulse of a pair, changing said selected interval and again transmitting a pulse until the selected interval is such that the transmitted pulse reaches said beacon at a time immediately prior to emission by the beacon of the second pulse of the pair, and using the finally selected interval along with the measured time interval between pulses of a pair to determine said distance.

References Cited in the file of this patent

UNITED STATES PATENTS

| | | |
|---|---|---|
| 1,894,019 | Buckley | Jan. 10, 1933 |
| 2,424,263 | Woodyard | July 22, 1947 |
| 2,459,811 | Grieg | Jan. 25, 1949 |
| 2,727,229 | Anast et al. | Dec. 13, 1955 |